United States Patent [19]

Patel et al.

[11] Patent Number: 5,041,293

[45] Date of Patent: Aug. 20, 1991

[54] METHOD OF ADDING LECITHIN TO CHEWING GUM

[75] Inventors: Mansukh M. Patel, Downers Grove; Edward S. Dubina, Evergreen Park, both of Ill.

[73] Assignee: Wm. Wrigley Jr. Company, Chicago, Ill.

[21] Appl. No.: 457,410

[22] Filed: Dec. 28, 1989

[51] Int. Cl.$^5$ .............................................. A23G 3/30
[52] U.S. Cl. ...................................... 426/3; 426/662; 426/654
[58] Field of Search ........................................ 426/3-6, 426/548, 804, 662, 654

[56] References Cited

U.S. PATENT DOCUMENTS

| | | | |
|---|---|---|---|
| 1,995,281 | 4/1929 | Epstein | 426/662 |
| 2,430,553 | 11/1947 | Bigelow | 426/662 |
| 2,447,726 | 8/1946 | Allingham | 426/662 |
| 2,708,631 | 5/1955 | Neiman | 426/662 |
| 2,929,723 | 3/1960 | Schutlz et al. | 426/662 |
| 3,012,888 | 12/1961 | Davis et al. | 426/662 |
| 3,549,382 | 12/1970 | Hansen | 426/662 |
| 3,920,857 | 11/1975 | Barker et al. | 426/662 |
| 3,995,064 | 11/1976 | Ehrgott | 426/3 |
| 4,357,354 | 11/1982 | Kehoe et al. | 426/3 |
| 4,493,849 | 1/1985 | Carroll et al. | 426/662 |
| 4,604,288 | 8/1986 | Glass et al. | 426/3 |
| 4,748,027 | 5/1988 | Schou et al. | 426/662 |
| 4,943,389 | 7/1990 | Weete et al. | 426/662 |

FOREIGN PATENT DOCUMENTS 0008589  4/1914  Austria ................................ 426/662

*Primary Examiner*—Jeanette Hunter
*Attorney, Agent, or Firm*—Willian Brinks Olds Hofer Gilson & Lione

[57] ABSTRACT

A method of adding lecithin to chewing gum is provided by the present invention. The method comprises mixing from about 20 parts to about 70 parts by weight lecithin with from about 30 parts to about 80 parts by weight water. The resulting aqueous lecithin mixture is allowed to stand until a gelatinous lecithin forms. Thereafter, the gelatinous lecithin is mixed with an amount of a bulking agent such that the bulking agent comprises from about 25 parts to about 85 parts by weight of the resulting lecithin mixture. Whereupon, the lecithin mixture is mixed with chewing gum.

9 Claims, No Drawings

5,041,293

METHOD OF ADDING LECITHIN TO CHEWING GUM

BACKGROUND OF THE INVENTION

The present invention relates to a method of adding lecithin to chewing gum. Lecithin is used in chewing gum primarily as a softener, as well as a texture modifier, for gum base and as an emulsifier or dispersing agent for flavor. Typically, lecithin is employed in chewing gum in very small quantities—less than 1% by weight of the chewing gum composition. The fact that lecithin is used in very small quantities combined with the fact that relatively pure lecithin is physically a particulate solid presents difficulties with respect to adequately dispersing the lecithin in the chewing gum.

There are methods known by those skilled in the art of adding lecithin to chewing gum directed to achieving adequate lecithin dispersion. However, there are associated disadvantages to these known methods. For example, in U.S. Pat. No. 4,604,288 to Glass et al., a method of adding lecithin to chewing gum is disclosed wherein the lecithin is first dissolved in the liquid flavor. After which, the liquid flavor is added to the chewing gum. Although the method disclosed in Glass et al. improves lecithin dispersion, it provides for little manufacturing flexibility. Specifically, the amount of lecithin added to a chewing gum is strongly dependent on the chewing gum's particular composition. Thus, the amount of lecithin added to the flavor for use in a particular chewing gum is quite specific to that chewing gum's particular composition. Therefore, a flavor containing a specific optimum amount of lecithin prepared for a particular chewing gum composition is less suitable for use in another chewing gum having a different composition. Thus, once the lecithin has been added to the flavor for use in a particular chewing gum, that particular batch of flavor would be inappropriate for addition to a different chewing gum composition, and, hence, the inflexibility of the method disclosed in Glass et al.

Another approach to the problem of achieving adequate lecithin dispersion throughout the chewing gum involves the dissolution of lecithin in an oil with the subsequent addition of the dissolved lecithin/oil composition to the chewing gum. Although providing for improved lecithin dispersion, the aforedescribed approach presents one primary disadvantage. Mainly, the oil is prone to oxidation, thereby imparting undesirable off-notes to the chewing gum's flavor and aroma.

Accordingly, it is an object of the present invention to provide for a method of adding lecithin to chewing gum which achieves improved lecithin dispersion throughout the chewing gum, while at the same time avoiding the previously discussed disadvantages associated with other methods of adding lecithin to chewing gum known in the art. Such a method of adding lecithin to chewing gum would be readily accepted and enjoy great commercial success.

SUMMARY OF THE INVENTION

A method of adding powdered lecithin to chewing gum which serves to adequately disperse the lecithin throughout the chewing gum has unexpectedly been discovered. The method comprises treating the lecithin in such a manner so as to achieve substantial dispersion of the lecithin when added to the chewing gum. The method of adding lecithin to chewing gum disclosed by the present invention does not adversely effect the flavor or aroma of the chewing gum. Furthermore, as the lecithin is added as a powder pursuant to the method of the present invention, substantial manufacturing flexibility is retained.

In accordance with one embodiment of the present invention, a method of adding lecithin to chewing gum is contemplated. The method comprises mixing from about 20 parts to about 70 parts by weight lecithin with from about 30 parts to about 80 parts by weight water and allowing the resulting aqueous lecithin mixture to stand until a gelatinous lecithin forms. Thereafter, the gelatinous lecithin is mixed with an amount of bulking agent so that the bulking agent comprises from about 25 parts to about 85 parts by weight of the resulting lecithin mixture. The gelatinous lecithin and bulking agent are mixed until a smooth and uniform consistency is achieved. The resulting lecithin mixture is then mixed with the chewing gum such that lecithin comprises from about 0.05% to about 3% by weight of the chewing gum.

In accordance with another embodiment of the present invention, residual moisture is removed from the mixture of gelatinous lecithin and bulking agent prior to mixing it with the chewing gum. In particular, an amount of residual moisture is removed sufficient to reduce the moisture content of the gelatinous lecithin and bulking agent mixture to less than about 3% by weight.

In accordance with yet another embodiment of the present invention, a method of manufacturing a lecithin composition is contemplated. The method comprises mixing from about 20 parts to about 70 parts by weight lecithin with from about 30 parts to about 80 parts by weight water. The resulting aqueous lecithin mixture is allowed to stand for an amount of time sufficient to allow a gelatinous lecithin to form. Thereafter, an amount of bulking agent is mixed with the gelatinous lecithin so that the resulting lecithin mixture comprises from about 25 parts to about 85 parts by weight bulking agent.

In accordance with another embodiment of the present invention, residual moisture is removed from the lecithin and bulking agent mixture so that the mixture's moisture content is reduced to less than about 3% by weight.

In yet another embodiment of the present invention, a lecithin composition is contemplated. The lecithin composition comprises lecithin in an amount from about 20 parts to about 70 parts by weight, and bulking agent in an amount from about 30 parts to about 80 parts by weight of the lecithin composition.

DETAILED DESCRIPTION OF THE PREFERRED EMBODIMENTS

In accordance with the present invention, a method of adding lecithin to chewing gum as a powdery lecithin preparation is provided. The method comprises mixing until homogenous from about 20 parts to about 70 parts by weight lecithin with from about 30 parts to about 80 parts by weight water. Preferably, from about 20 parts to about 40 parts by weight lecithin is mixed with from about 60 parts to about 80 parts by weight water. Most preferably however, from about 20 parts to about 25 parts by weight lecithin is mixed with from about 75 parts to about 80 parts by weight water.

The lecithin used in the instant process should be of a high quality and purity, being substantially free from flavor off-notes or negative residual flavor. Ordinarily, particulate lecithin is available with a purity of 95% acetone insolubles which is suitable for the instant process. According to the method of the present invention the lecithin will preferably have a purity of about 80% acetone insolubles and most preferably about 95% acetone insolubles. *Grant & Hackh's Chemical Dictionary,* 5th edition, 1987, defines lecithin as a group of substances of general composition:

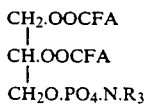

wherein FA is a fatty acid and R is an alkyl radical. Lecithins are the esters of oleic, stearic, palmitic, or other fatty acids with glycerolphosphoric acid and choline. Lecithins are classified as phosphoglycerides or phosphatides. In the instant invention, the lecithin will preferably have a minimum of about 80% by weight of phosphatide present. This purity level is generally designated in commercially available lecithins as 80% acetone insolubles. The phrase "80% acetone insolubles" refers to the fact that upon dissolution of the lecithin in acetone, 80% of the lecithin's phosphatide portion remains insoluble. Residual impurities such as oil, moisture and soluble non-phosphatides account for 20% of the materials dissolved and extracted by the acetone.

As previously stated, the lecithin and water are mixed. Mixing of lecithin and water may be accomplished by any high or low shear mixer known in the art. Once the lecithin and water have been mixed, the resulting aqueous lecithin mixture is allowed to stand until a gelatinous lecithin forms. The aqueous lecithin mixture will form into a gelatinous lecithin in approximately one-half hour at room temperature and pressure.

Once the aqueous lecithin mixture forms into a gelatinous lecithin, a bulking agent is mixed with the gelatinous lecithin. The gelatinous lecithin and bulking agent are mixed until homogenous according to any method of mixing known in the art. The mixing is continued until the resulting mixture of lecithin and bulking agent achieves a smooth and uniform consistency. The amount of bulking agent mixed with the gelatinous lecithin is such that the resulting lecithin mixture comprises from about 25 parts to about 85 parts by weight bulking agent. Preferably, the resulting mixture will comprise from about 50 parts to about 75 parts by weight bulking agent. Most preferably, however, the resulting mixture will comprise from about 60 parts to about 70 parts by weight bulking agent.

The present invention contemplates any bulking agent known by those skilled in the art. Preferably, however, the present invention contemplates a bulking agent selected from the group consisting of mannitol, sugar, xylitol, sorbitol, dextrose, calcium carbonate, and mixtures thereof. Most preferably, the present invention contemplates the use of mannitol as the buling agent.

The resulting lecithin mixture is then mixed with a chewing gum. Preferably, an amount of the lecithin composition is added to the chewing gum so that lecithin comprises from about 0.05% to about 3% by weight of the chewing gum.

In a preferred embodiment of the present invention, residual moisture is removed from the mixture of gelatinous lecithin and bulking agent before it is mixed with the chewing gum. Preferably, an amount of residual moisture is removed from the gelatinous lecithin and bulking agent mixture so that the mixture has a moisture content of less than about 3% by weight. Most preferably, the moisture content of the gelatinous lecithin and bulking agent mixture is reduced to less than about 1% by weight.

Any method of removing moisture from the gelatinous lecithin and bulking agent mixture known by those skilled in the art is contemplated by the method of the present invention. However, the preferred method of removing moisture from the gelatinous lecithin and bulking agent mixture is by drying the aforesaid mixture in a vacuum oven. Specifically, the gelatinous lecithin and bulking agent mixture is dried in an oven at about 75° F. to about 90° F. for about 4 hours to about 7 hours under vacuum of about 0.5 atmospheres to about 0.05 atmospheres until the lecithin mixture is powdery and non-coalescing. Any commercially available vacuum oven known in the art is suitable for use in the present invention.

In general, a chewing gum composition comprises a water soluble bulk portion, a water insoluble chewable gum base portion, and, typically, water insoluble flavors. The water soluble bulk portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber, as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include paraffin, microcrystalline and natural waxes such as beeswax and carnauba. The insoluble gum base constitutes between about 5% to about 95% by weight of the gum. Preferably, the insoluble gum base comprises about 10% to about 50% by weight of the gum, and more preferably, about 20% to about 30% by weight of the gum.

The gum base typically also includes a filler component. Illustrative filler components include, for example, calcium carbonate, magnesium carbonate, talc, dicalcium phosphate and the like. The filler may constitute between about 5% to about 60% by weight of the gum base. Preferably, the filler comprises from about 5% to about 50% by weight of the chewing gum base.

Gum base typically also contains softeners, including glycerol monostearate and glycerol triacetate. Further, gum bases may also contain optional ingredients such as antioxidants, colors and emulsifiers. The present invention contemplates employing any commercially available gum base.

The water soluble portion of the chewing gum may further comprise softeners, sweeteners, flavors and combinations thereof. The softeners are added to the chewing gum in order to optimize the texture, chewability and mouth feel of the gum. Softeners, also known in the art as plasticizers or plasticizing agents, generally constitute between about 0.5% to about 15% by weight of the chewing gum. Softeners contemplated by the present invention include lecithin added to the chewing gum according to the method of the present invention, as well as combinations of such lecithin with, for example, glycerin. Additionally, aqueous sweetener solutions such as those containing sorbitol, hydrogenated starch hydrosylates, corn syrup and combinations thereof may also be used as softeners and binding agents in gum.

Sweeteners are also contemplated by the present invention for addition to the chewing gum. These sweeteners include both sugar and sugarless components. Sugar sweeteners generally include saccharide containing compounds commonly known in the chewing gum art which comprise, but are not limited to, sucrose, dextrose, maltose, dextrin, dried invert sugar, fructose, levelose, galactose, corn syrup solids, and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrosylates, maltitol, and the like alone or in any combination. Also contemplated for a direct addition to the chewing gum are relatively faster releasing high intensity sweeteners such as thaumatin, aspartame, sucralose, acesulfame-K, alitame and saccharin.

Those skilled in the art will recognize that any combination of sugar and/or sugarless sweeteners may be employed in the chewing gum. Further, those skilled in the art will recognize a sweetener may be present in a chewing gum in whole or in part as a water soluble bulking agent. In addition, the softener may be combined with a sweetener such as in an aqueous sweetener solution.

A flavor may be present in a chewing gum in an amount from about 0.1% to about 10% by weight, and preferably from about 0.5% to about 3% by weight of the chewing gum. Flavors contemplated by the present invention include any liquid flavoring which is of a food acceptable quality. The flavor may comprise essential oils, synthetic flavors, or mixtures thereof including, but not limited to, oils derived from plants and fruits such as citrus oils, fruit essences, peppermint oil, spearmint oil, clove oil, oil of wintergreen, anise, and the like. Artificial flavoring components are also contemplated by the present invention. Those skilled in the art will recognize that the natural and artificial flavors may be combined in any manner. All such flavors and blends are contemplated by the present invention.

Additional ingredients such as colors, emulsifiers and pharmaceutical agents may be added to the chewing gum as well.

In general, chewing gum is manufactured by sequentially adding the various chewing gum ingredients to any commercially available known mixer in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color may also be added at this time. The lecithin may be then added next along with syrup and a portion of bulking agent. However, the present invention contemplates the addition of lecithin at any time during the manufacture of the chewing gum. Further portions of the bulking agents may be added to the mixer.

The entire mixing procedure typically takes from about 5 to 15 minutes, but longer mixing times may sometimes be required. Those skilled in the art will recognize and make variations to the above-described procedure. It is to be understood that an equivalent of changes and modifications of the embodiments described above are also contemplated by the present invention. The following example is not to be construed as a limitation upon the present invention, but is included merely as an illustration of one embodiment of the present invention.

EXAMPLE

Two chewing gums were made according to the formulations provided in Table I below.

TABLE I

| Ingredient | A (%) | B (%) |
| --- | --- | --- |
| Sorbitol | 49.594 | 49.594 |
| Base | 24.0 | 24.0 |
| Lycasin/Glycerin[1] | 9.2 | 9.2 |
| Mannitol | 8.0 | 7.48 |
| Glycerin | 7.3 | 7.3 |
| Flavor | 1.48 | 1.48 |
| Encapsulated APM[2] | 0.216 | 0.216 |
| 10% Salt Solution[3] | 0.08 | 0.08 |
| Lecithin[4] | 0.13 | 0.65 |
|  | 100% | 100% |

[1]An aqueous solution comprising 67.5% Lycasin solids; 25% Glycerin; and 7.5% water. (Lycasin is a tradename under which Roquette Frers of France markets hydrogenated starch hydrosylates).
[2]Encapsulated Aspartame.
[3]Aqueous solution of 10% sodium chloride.
[4]Chewing gum composition A employed 95% pure lecithin having a granular form. Chewing gum composition B employed a powdered lecithin prepared according to the method of the present invention specified below.

The lecithin utilized in chewing gum B was prepared according to the following method. Twenty-five parts 95% pure lecithin were mixed with 50 parts water. Mixing was accomplished in a 500 milliliter beaker by manually stirring the aqueous lecithin solution with a stirring rod. The resulting mixture was allowed to stand for about ½ hour at room temperature and pressure until a gelatinous lecithin formed. The resulting gelatinous lecithin was then mixed with 100 parts of mannitol. The resulting mixture was mixed as above until a smooth, uniform, frosting-like consistency was achieved. Thereafter, the resulting lecithin mixture was dried in a vacuum oven at about 80° F. for about 5 hours until the lecithin mixture had been dried to a moisture content of about 0% by weight, thereby yielding a powdery and essentially non-coalescing lecithin composition.

RESULTS

The two chewing gum compositions A and B above were compared both visually and microscopically at 10x power. Chewing gum A manifested unincorporated lecithin granules, whereas chewing gum B was free of lecithin granules. It was thus concluded that the lecithin added to chewing gum B by the method of the present invention was finely and homogenously dispersed throughout the chewing gum.

We claim:

1. A method of adding lecithin to chewing gum comprising the following steps:
   providing lecithin;
   providing water;
   mixing from about 20 parts to about 70 parts by weight of the lecithin with from about 30 parts to about 80 parts by weight of the water;
   allowing the resulting aqueous lecithin solution to stand until a gelatinous lecithin forms;
   providing a bulking agent;

mixing until homogenous the gelatinous lecithin with the bulking agent so that the bulking agent comprises from about 25 parts to about 80 parts by weight of the resulting lecithin mixture;

providing a chewing gum;

mixing the lecithin mixture with the chewing gum such that lecithin comprises from about 0.05% to about 3% by weight of the chewing gum.

2. The method of claim 1 comprising the additional step wherein prior to mixing with the chewing gum residual moisture is removed from the lecithin mixture so that the lecithin mixture has a moisture content of less than about 3% by weight.

3. The method of claim 2 wherein from about 20 parts to about 40 parts by weight lecithin are mixed with from about 60 parts to about 80 parts by weight water.

4. The method of claim 3 wherein from about 20 parts to about 25 parts by weight lecithin are mixed with from about 75 parts to about 80 parts by weight water.

5. The method of claim 4 wherein the bulking agent comprises from about 50 parts to about 80 parts by weight of the lecithin mixture.

6. The method of claim 5 wherein the bulking agent comprises from about 60 parts to about 70 parts by weight of the lecithin mixture.

7. The method of claim 6 wherein the bulking agent comprises a bulking agent selected from the group consisting of mannitol, sugar, xylitol, sorbitol, dextrose, calcium carbonate and mixtures thereof.

8. The method of claim 6 wherein the bulking agent comprises mannitol.

9. A method of adding lecithin to chewing gum comprising the following steps:

providing lecithin;

providing water;

mixing from about 20 parts to about 25 parts by weight of the lecithin with from about 75 parts to about 80 parts by weight of the water;

allowing the resulting aqueous lecithin solution to stand until a gelatinous lecithin forms;

providing a bulking agent wherein the bulking agent is selected from the group consisting of mannitol, sugar, xylitol, sorbitol, dextrose, and mixtures thereof;

mixing until homogenous the gelatinous lecithin with the bulking agent so that the bulking agent comprises from about 60 parts to about 70 parts by weight of the resulting lecithin mixture;

removing residual moisture from the lecithin mixture so that the lecithin mixture has a moisture content of less than about 3% by weight;

providing a chewing gum; and mixing the lecithin mixture with the chewing gum such that lecithin comprises from about 0.05% to about 3% by weight of the chewing gum.

* * * * *

UNITED STATES PATENT AND TRADEMARK OFFICE
CERTIFICATE OF CORRECTION

PATENT NO. : 5,041,293

DATED : August 20, 1991

INVENTOR(S) : Mansukh M. Patel et al.

It is certified that error appears in the above-identified patent and that said Letters Patent is hereby corrected as shown below:

In column 3, line 59, please delete "buling" and substitute therefor --bulking--.

Signed and Sealed this

Ninth Day of March, 1993

Attest:

STEPHEN G. KUNIN

*Attesting Officer*   *Acting Commissioner of Patents and Trademarks*